United States Patent
Lee et al.

(10) Patent No.: US 9,049,538 B2
(45) Date of Patent: Jun. 2, 2015

(54) MOBILE COMMUNICATION DEVICES, CELLULAR ACCESS STATIONS, AND OPERATION MANAGEMENT METHODS FOR MACHINE-TO-MACHINE (M2M) COMMUNICATIONS

(71) Applicant: VIA Telecom, Inc., San Diego, CA (US)

(72) Inventors: Anthony Lee, San Diego, CA (US); Guotong Wang, Beijing (CN)

(73) Assignee: VIA TELECOM CO., LTD., George Town, Grand Cayman (KY)

( * ) Notice: Subject to any disclaimer, the term of this patent is extended or adjusted under 35 U.S.C. 154(b) by 166 days.

(21) Appl. No.: 13/849,053

(22) Filed: Mar. 22, 2013

(65) Prior Publication Data

US 2013/0265952 A1    Oct. 10, 2013

Related U.S. Application Data

(60) Provisional application No. 61/620,031, filed on Apr. 4, 2012.

(51) Int. Cl.
*H04W 4/00* (2009.01)

(52) U.S. Cl.
CPC ..................... *H04W 4/005* (2013.01)

(58) Field of Classification Search
None
See application file for complete search history.

(56) References Cited

U.S. PATENT DOCUMENTS

| | | | |
|---|---|---|---|
| 6,560,453 B1 * | 5/2003 | Henry et al. | 455/67.11 |
| 8,620,336 B2 * | 12/2013 | Golaup et al. | 455/450 |
| 2003/0114156 A1 * | 6/2003 | Kinnavy | 455/434 |
| 2005/0036464 A1 * | 2/2005 | Rajkotia et al. | 370/336 |
| 2005/0090269 A1 * | 4/2005 | Kim et al. | 455/458 |
| 2005/0164741 A1 * | 7/2005 | Rajkotia et al. | 455/561 |
| 2006/0246924 A1 * | 11/2006 | Balasubramanian et al. | 455/459 |
| 2007/0232330 A1 * | 10/2007 | Ranganathan | 455/458 |
| 2011/0201344 A1 * | 8/2011 | Ryu et al. | 455/450 |
| 2012/0302229 A1 * | 11/2012 | Ronneke | 455/422.1 |
| 2013/0015953 A1 * | 1/2013 | Hsu et al. | 340/7.46 |
| 2013/0039243 A1 * | 2/2013 | Park et al. | 370/311 |
| 2013/0077579 A1 * | 3/2013 | Cho et al. | 370/329 |
| 2013/0136072 A1 * | 5/2013 | Bachmann et al. | 370/329 |
| 2013/0155954 A1 * | 6/2013 | Wang et al. | 370/328 |
| 2013/0203449 A1 * | 8/2013 | Tiedemann et al. | 455/458 |

\* cited by examiner

*Primary Examiner* — Anh-Vu Ly
(74) *Attorney, Agent, or Firm* — McClure, Qualey & Rodack, LLP (57) ABSTRACT

A mobile communication device configured for Machine-to-Machine (M2M) communications is provided. In the mobile communication device, a wireless module performs wireless transmissions and receptions to and from a service network, and a controller module receives a message with a Slot Cycle Index (SCI) only for the M2M communications from the service network via the wireless module and instructs the wireless module to monitor a paging channel according to the SCI only for the M2M communications.

12 Claims, 5 Drawing Sheets

MOBILE COMMUNICATION DEVICES, CELLULAR ACCESS STATIONS, AND OPERATION MANAGEMENT METHODS FOR MACHINE-TO-MACHINE (M2M) COMMUNICATIONS

CROSS REFERENCE TO RELATED APPLICATIONS

This application also claims priority of U.S. Provisional Application No. 61/620,031, filed on Apr. 4, 2012, and the entirety of which is incorporated by reference herein.

BACKGROUND OF THE INVENTION

1. Field of the Invention

The invention generally relates to the operation management for Machine-to-Machine (M2M) communications, and more particularly, to Slot Cycle Index (SCI) configuration and timer assignment for M2M communications.

2. Description of the Related Art

For a long time, various machines have been provided to make our lives more convenient in every way. Generally, machines, nowadays, are equipped with computing processors and software to accommodate us with more intelligence-based services. With the advancement of wireless communications, Machine-to-Machine (M2M) technology has been developed to enable communications between remote machines for exchanging information and operating without human interaction. Especially for critical public infrastructures, such as water treatment facilities and bridges, M2M sensors may be employed to monitor the operation statuses of facilities and report measurement results back to control centers via wireless communication networks, such as a Global System for Mobile Communication/General Packet Radio Service (GSM/GPRS), Universal Mobile Telecommunication System (UMTS), Code Division Multiple Access 2000 1x (CDMA2000 1x) system, 1x High Rate Packet Data (1xHRPD) system, and Long Term Evolution (LTE) system, etc. This allows administrators of the critical public infrastructures to know if certain components have been tampered with. Other applications may be earthquake monitoring, electric metering, gas/oil pipeline monitoring, or coke machine maintenance for reporting operation statuses to a centralized system via wireless communication networks, such that related services with higher efficiency and lower maintenance costs may be provided.

In addition to the M2M devices, a typical mobile communication environment also comprises general-purpose Mobile Stations (MS's) which may communicate voice and/or data signals with one or more service networks via radio access stations of the service networks, wherein each of the general-purpose MS's generally uses a rechargeable battery that only lasts for a certain period of time. However, the general-purpose MS's are used on a daily basis during all hours of the day, and thus, may run out of battery power unless the battery is regularly charged. In order to control battery power consumption, a technique called Slot Cycle Index (SCI) may be employed. Simply put, the slot cycle for the standby time of the general-purpose MS's may be increased by adjusting the SCI for the general-purpose MS's. Conventionally, the SCI is set to a value, such that the general-purpose MS's may not have to wake up constantly, while also making sure that incoming calls for the general-purpose MS's will be received (since the voice service is one of the most important communication services conducted on the general-purpose MS's).

Note that, such configuration of the SCI is applied both to the general-purpose MS's and the M2M devices. However, for the M2M devices, the M2M communications provided thereon are usually delay-tolerant and are usually initiated over long repetitions, such as once an hour, once a day, once a week, or once a month, etc., depending on the service type of the M2M communications. Also, a similar problem exists in the assignment of a timer for the general-purpose MS's and the M2M devices to periodically receive overhead messages broadcasted by the radio access station, wherein the overhead messages comprise system information which is updated frequently by both of the general-purpose MS's and the M2M devices.

BRIEF SUMMARY OF THE INVENTION

Thus, the invention proposes to separate the configuration of the SCI for the general-purpose MS's and the M2M devices, and to separate the assignment of the timer for the general-purpose MS's and the M2M devices.

In one aspect of the invention, a mobile communication device configured for M2M communications is provided. The mobile communication device comprises a wireless module and a controller module. The wireless module performs wireless transmissions and receptions to and from a service network. The controller module receives a message with a Slot Cycle Index (SCI) for the M2M communications from the service network via the wireless module, and instructing the wireless module to monitor a paging channel according to the SCI for the M2M communications.

In another aspect of the invention, a service network is provided. The service network comprises a radio access network and a core network. The radio access network performs wireless transmissions and receptions to and from a mobile communication device configured for M2M communications. The core network transmits a message with an SCI for the M2M communications to the mobile communication device via the radio access network, such that the mobile communication device performs monitoring of a paging channel according to the SCI for the M2M communications.

In yet another aspect of the invention, an operation management method for M2M communications is provided. The operation management method comprises the steps of: providing a mobile communication device configured for the M2M communications with a service network; receiving, by the mobile communication device, a message with a Slot Cycle Index (SCI) for the M2M communications from the service network; and performing, by the mobile communication device, monitoring of a paging channel according to the SCI for the M2M communications.

Other aspects and features of the present invention will become apparent to those with ordinarily skill in the art upon review of the following descriptions of specific embodiments of mobile communication devices, service networks, and operation management methods.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
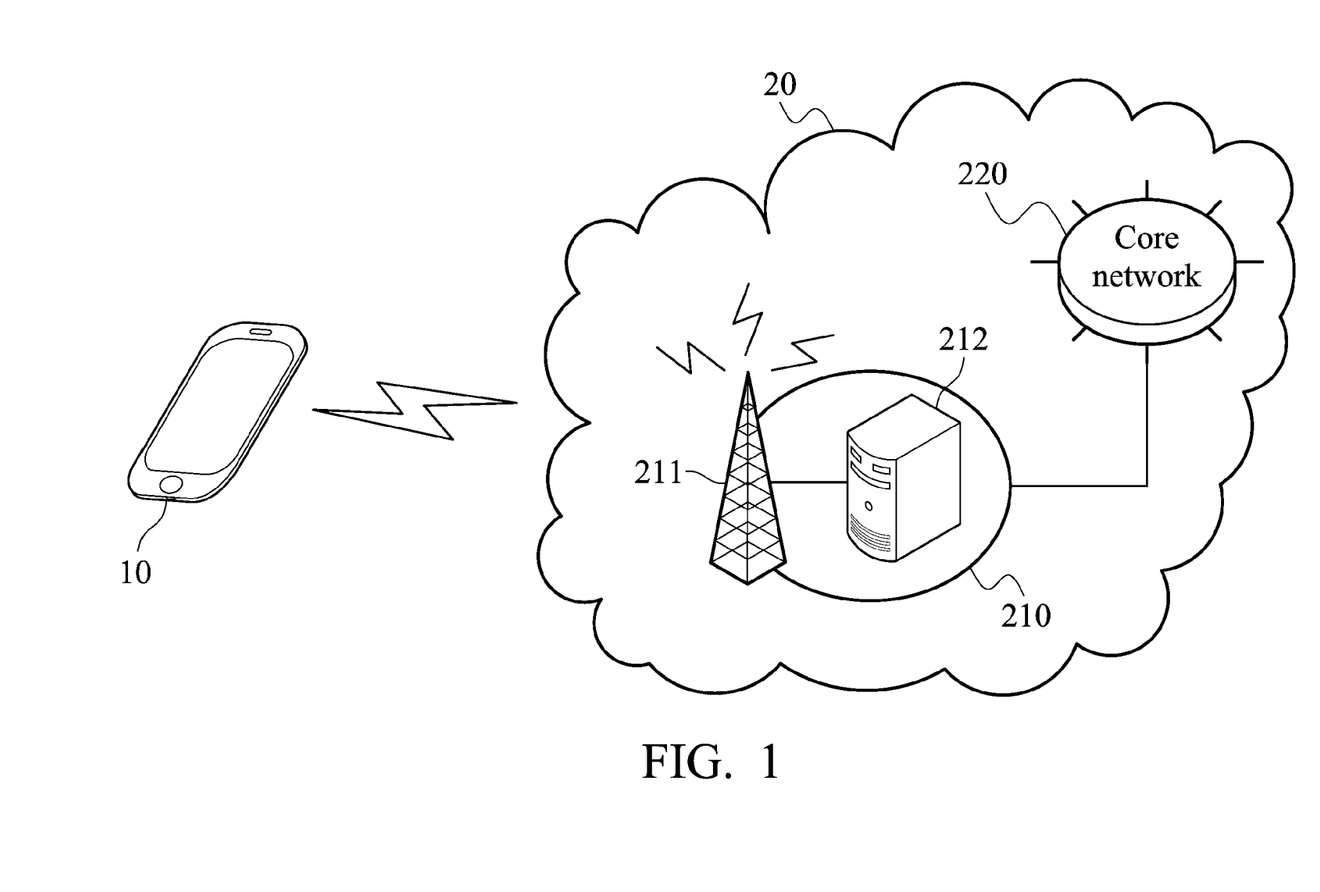
FIG. 1 is a block diagram illustrating a mobile communication environment according to an embodiment of the invention.

FIG. 1 is a block diagram illustrating a mobile communication environment according to an embodiment of the invention. In the mobile communication environment, the mobile communication device 10 is configured for M2M communications with the service network 20 via an air interface. The service network 20 comprises a radio access network 210 and a core network 220, wherein the radio access network 210 is responsible for processing radio signals, terminating radio protocols, and connecting the mobile communication device 10 with the core network 220. The radio access network 210 comprises at least a cellular access station 211 and an access station controller 212. The cellular access station 211 may be a Base Transceiver Station (BTS) or a Base Station (BS), which is controlled by the access station controller 212 and is responsible for providing wireless transceiving functionality for the service network 20. Specifically, the cellular access station 211 generally serves one cell or multiple logical sectors. The access station controller 212 is responsible for controlling the operation of the cellular access station 211, i.e., managing radio resources, radio parameters, and interfaces for the cellular access station 211. The core network 220 is responsible for performing mobility management, network-side authentication, and interfaces with public networks.

In one embodiment, the service network 20 is a CDMA2000 1x system (including 1 xRTT, 1xEV-DO Release 0/A/B/C, 1xEV-DO Revision D/E/F). The cellular access station 211 is a Base Transceiver Station (BTS), and the access station controller 212 is a Base Station Controller (BSC). The core network 220 comprises a Circuit-Switched (CS) domain and a Packet-Switched (PS) domain, wherein the CS domain comprises several network entities, such as a Mobile Switching Center emulation (MSCe), Media Gateway (MGW), Media Resource Function Processor (MRFP), Signaling Gateway (SGW), Service Control Point emulation (SCPe), and Home Location Register emulation (HLRe), and the PS domain comprises Packet Data Service Node (PDSN) and Authentication Authorization Accounting (AAA) servers. It is to be understood that, the CDMA2000 1x system is merely an illustrative example, and other wireless communication networks utilizing any future technology of the CDMA2000 1x technology family may be used instead, and the invention is not limited thereto.

Figure 2:
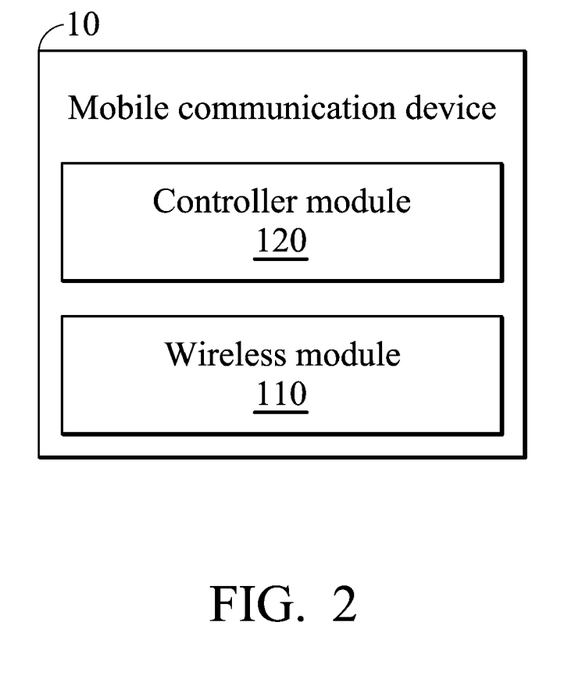
FIG. 2 is a block diagram illustrating the mobile communication device 10 in the embodiment of FIG. 1.

FIG. 2 is a block diagram illustrating the mobile communication device 10 in the embodiment of FIG. 1. The mobile communication device 10 may comprise a wireless module 110 and a controller module 120, wherein the wireless module 110 is configured to perform the functionality of wireless transceiving and the controller module 120 is configured to control the operation of the wireless module 110. To further clarify, the wireless module 110 may be a Radio Frequency (RF) unit (not shown), and the controller module 120 may be a general-purpose processor or Micro-Control Unit (MCU) of a baseband unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 800 MHz, 1900 MHz, or 2400 MHz utilized in CDMA2000 1x technology, or others depending on the radio access technology in use. Although not shown, the mobile communication device 10 may further comprise other functional components, such as a display unit and/or keypad serving as the Man-Machine Interface (MMI), a storage unit storing the program codes of applications, or others.

Figure 3:
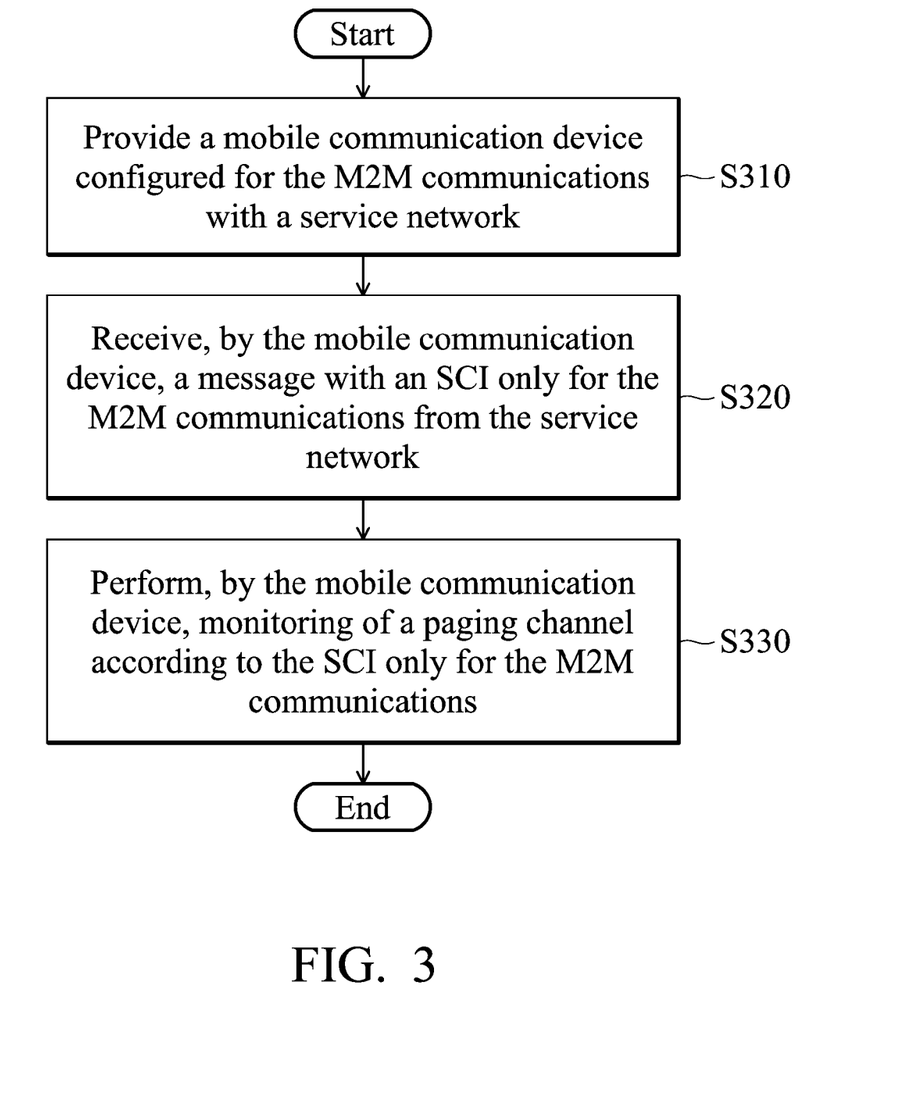
FIG. 3 is a flow chart illustrating the operation management method for M2M communications according to an embodiment of the invention.

FIG. 3 is a flow chart illustrating the operation management method for M2M communications according to an embodiment of the invention. To begin, a mobile communication device configured for M2M communications with a service network is provided (step S310). The mobile communication device configured for M2M communications may be referred to as an M2M device. Next, the mobile communication device receives a message with an SCI only for the M2M communications from the service network (S320). Note that, in the invention, the message comprises an independent field for specifying the SCI which is dedicated for the M2M communications only. That is, the SCI only for the M2M communications is different from the SCI for the general-purpose MS's. After that, the mobile communication device performs monitoring of a paging channel according to the SCI only for the M2M communications (step S330). To further clarify, the message in step S320 may be a System Parameters Message or a Registration Accepted Order. Detailed descriptions of the message being a System Parameters Message or a Registration Accepted Order are provided below with respective message sequence charts.

Figure 4:
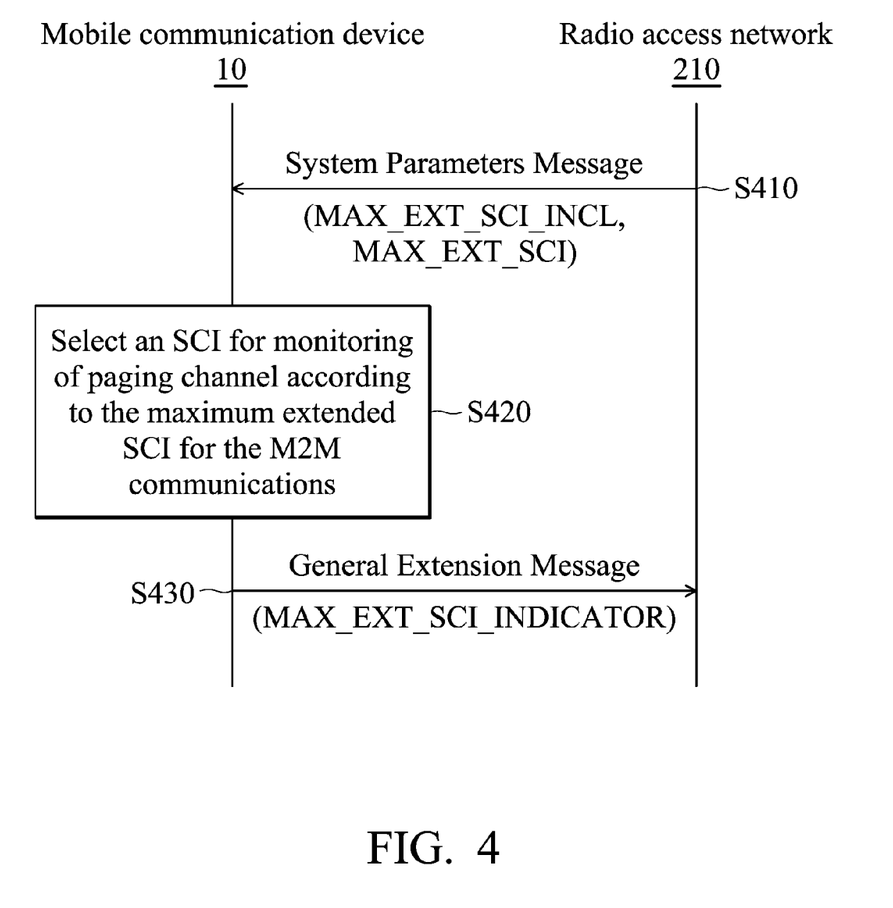
FIG. 4 is a message sequence chart illustrating the SCI configuration for M2M communications according to an embodiment of the invention.

FIG. 4 is a message sequence chart illustrating the SCI configuration for M2M communications according to an embodiment of the invention. As shown in FIG. 4, the radio access network 210 first transmits a System Parameters Message to the mobile communication device 10 (step S410). Specifically, the System Parameters Message comprises a "MAX_EXT_SCI_INCL" field and a "MAX_EXT_SCI" field, wherein the "MAX_EXT_SCI_INCL" field indicates whether the radio access network 210 supports the use of extended SCI or not. If the "MAX_EXT_SCI_INCL" field is set to 1, it means that the radio access network 210 supports the use of extended SCI, and the "MAX_EXT_SCI" field indicates a maximum extended SCI for the M2M communications. Otherwise, if the "MAX_EXT_SCI_INCL" field is set to 0, it means that the radio access network 210 does not support the use of extended SCI, and the "MAX_EXT_SCI" field should be omitted by the mobile communication device 10. In one embodiment, the "MAX_EXT_SCI_INCL" field may comprise 1 bit for storing the set value (i.e., 0 or 1), and the "MAX_EXT_SCI" field may comprise 0 or 3 bits for indicating a maximum extended SCI for the M2M communications. For example, the "MAX_EXT_SCI" field may comprise 3 bits if the "MAX_EXT_SCI_INCL" field is set to 1, and the 3 bits of the "MAX_EXT_SCI" field may constitute 8 different values, wherein each value represents a maximum extended SCI for the M2M communications. An exemplary representation of the maximum extended SCI for the M2M communications is given below.

TABLE 1

| MAX_EXT_SCI | Value of maximum SCI |
|---|---|
| 000 | 60 seconds |
| 001 | 60 minutes |
| 010 | 12 hours |
| 011 | 24 hours |
| 100 | 48 hours |
| 101 | 7 days |
| 110 | 14 days |
| 111 | 1 month |

Subsequently, due to the "MAX_EXT_SCI_INCL" field being set to 1 in this embodiment, the mobile communication device 10 reads the maximum extended SCI for the M2M communications indicated by the "MAX_EXT_SCI" field, and then selects an SCI for monitoring of the paging channel according to the maximum extended SCI for the M2M communications (step S420), wherein the selected SCI is less than or equal to the maximum extended SCI for the M2M communications, and the selected SCI is selected according to the service type of the M2M communications. For example, the selected SCI may have a larger value if the service type of the M2M communications is more delay-tolerant, or may be a smaller value otherwise.

After that, the mobile communication device 10 transmits, to the radio access network 210, a General Extension Message indicating that the maximum extended SCI for the M2M communications has been applied (step S430). Specifically, the General Extension Message comprises a "MAX_EXT_SCI_INDICATOR" field which indicates whether the maximum extended SCI for the M2M communications has been applied or not. If the "MAX_EXT_SCI_INDICATOR" field is set to 1, it means that the mobile communication device 10 has applied the maximum extended SCI for the M2M communications. Otherwise, if the "MAX_EXT_SCI_INDICATOR" field is set to 0, it means that the mobile communication device 10 has applied the maximum SCI for non-M2M communications (i.e., for general-purpose MS's), instead of the maximum extended SCI for the M2M communications. In one embodiment, the "MAX_EXT_SCI_INDICATOR" field may comprise 1 bit for storing the set value (i.e., 0 or 1).

Figure 5:
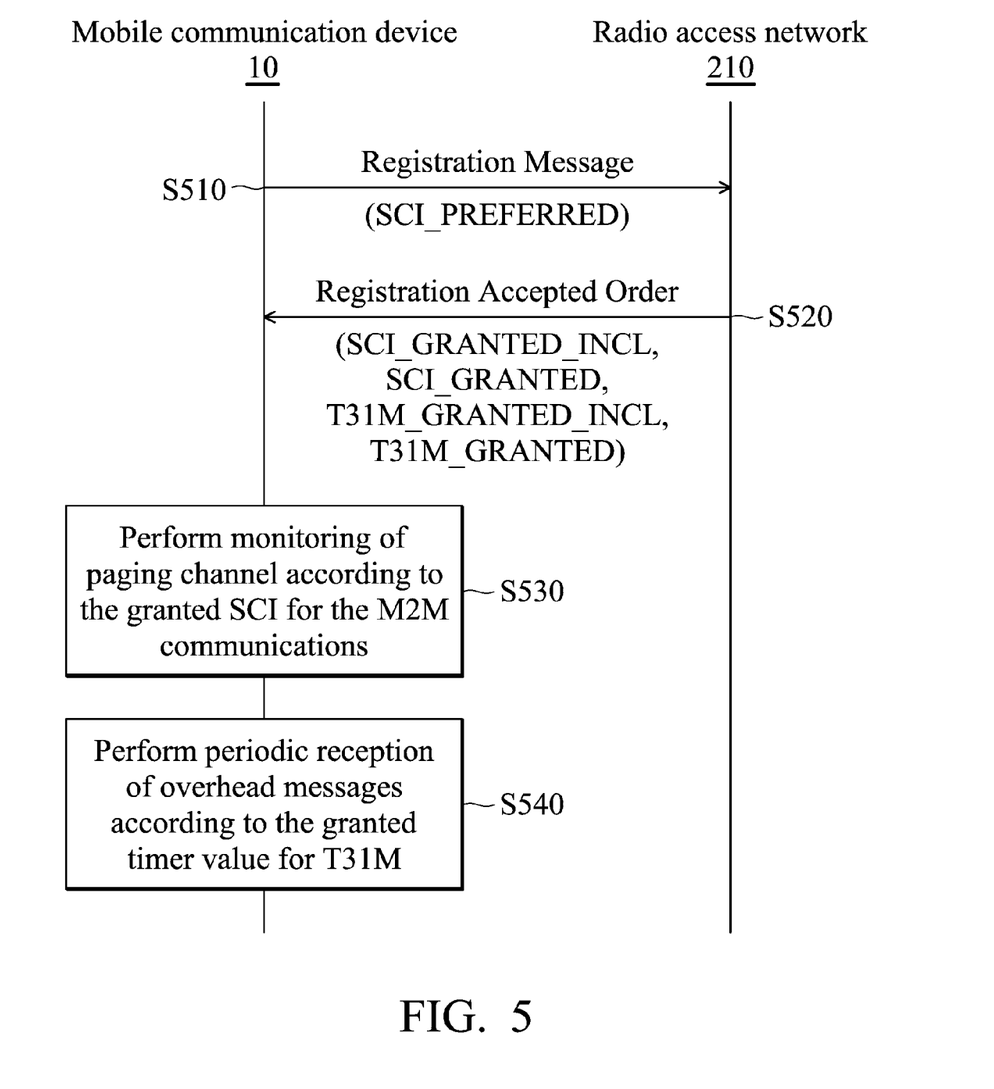
FIG. 5 is a message sequence chart illustrating the SCI configuration and timer assignment for M2M communications according to another embodiment of the invention.

FIG. 5 is a message sequence chart illustrating the SCI configuration and timer assignment for M2M communications according to another embodiment of the invention. As shown in FIG. 5, the mobile communication device 10 first transmits a Registration Message to the radio access network 210 (step S510). Specifically, the Registration Message comprises an "SCI_PREFERRED" field indicating a preferred SCI for the M2M communications. Similar to the "MAX_EXT_SCI" field, the "SCI_PREFERRED" field may comprise 0 or 3 bits for indicating the preferred SCI for the M2M communications. The preferred SCI for the M2M communications may be determined according to the service type of the M2M communications. For example, the preferred SCI may have a larger value if the service type of the M2M communications is more delay-tolerant, or may be a smaller value otherwise.

When receiving the Registration Message, the radio access network 210 replies with a Registration Accepted Order to the mobile communication device 10 (step S520). Specifically, the Registration Accepted Order comprises an "SCI_GRANTED_INCL" field, an "SCI_GRANTED" field, a "T31M_GRANTED_INCL" field, and a "T31M_GRANTED" field, wherein the "SCI_GRANTED_INCL" field indicates whether a granted SCI for the M2M communications is included or not, and the "T31M_GRANTED_INCL" field indicates whether a granted timer (i.e., T31M) value for the mobile communication device 10 to periodically receive overhead messages broadcasted by the radio access network 210 is included or not.

If the "SCI_GRANTED_INCL" field is set to 1, it means that a granted SCI for the M2M communications is included and the "SCI_GRANTED" field indicates the granted SCI for the M2M communications. Otherwise, if the "SCI_GRANTED_INCL" field is set to 0, it means that no granted SCI for the M2M communications is included and the "SCI_GRANTED" field should be omitted by the mobile communication device 10. In one embodiment, the "SCI_GRANTED_INCL" field may comprise 1 bit for storing the set value (i.e., 0 or 1), and the "SCI_GRANTED" field may comprise 0 or 3 bits for indicating the granted SCI for the M2M communications, similar to the "MAX_EXT_SCI" field. Also, similar to the preferred SCI for the M2M communications, the granted SCI for the M2M communications may be determined according to the service type of the M2M communications, and/or the operation status of the service network 20.

If the "T31M_GRANTED_INCL" field is set to 1, it means that a granted timer value for the T31M is included and the "T31M_GRANTED" field indicates the granted timer value for the T31M. Otherwise, if the "T31M_GRANTED_INCL" field is set to 0, it means that no granted timer value for the T31M is included and the "T31M_GRANTED" field should be omitted by the mobile communication device 10. In one embodiment, the "T31M_GRANTED_INCL" field may comprise 1 bit for storing the set value (i.e., 0 or 1), and the "T31M_GRANTED" field may comprise 0 or 3 bits for indicating the granted timer value for the T31M. For example, the "T31M_GRANTED" field may comprise 2 bits if the "T31M_GRANTED_INCL" field is set to 1, and the 2 bits of the "T31M_GRANTED" field may constitute 4 different values, wherein each value represents a granted timer value for the T31M. An exemplary representation of the granted timer value for the T31M is given below.

TABLE 2

| T31M_GRANTED | Value of T31M |
|---|---|
| 00 | 0.5 hour |
| 01 | 2 hours |
| 10 | Reserved |
| 11 | Reserved |

The granted timer value for the T31M may be determined according to the service type of the M2M communications. For example, the granted timer value may have a larger value if the service type of the M2M communications is more delay-tolerant, or may be a smaller value otherwise.

After that, due to both of the "SCI_GRANTED_INCL" field and the "T31M_GRANTED_INCL" field being set to 1 in this embodiment, the mobile communication device 10 reads the granted SCI for the M2M communications indicated by the "SCI_GRANTED" field and the granted timer value for the T31M indicated by the "T31M_GRANTED" field. Subsequently, the mobile communication device 10 performs monitoring of the paging channel according to the granted SCI for the M2M communications (step S530), and then performs periodic reception of overhead messages broadcasted by the radio access network 210 according to the granted timer value for the T31M (step S540). Note that, in this embodiment, the SCI configuration and timer assignment for M2M communications are performed via the registration procedure, wherein no resource of the Reverse Shared Channel (R-SCH) is required/occupied.

It is to be understood that, in the embodiment of FIG. 5, the "SCI_GRANTED" field and the "T31M_GRANTED" field may be included in the Registration Accepted Order only for the initial registration, and may not be included for subsequent registrations. For the mobile communication device 10, the granted SCI and time value for the M2M communications may be used until new values are updated by another Registration Accepted Order from the radio access network 210.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communication device, configured for Machine-to-Machine (M2M) communications, comprising:
   a Radio Frequency (RF) device performing wireless transmissions and receptions to and from a service network; and
   a baseband device receiving a System Parameters Message with a Slot Cycle Index (SCI) only for the M2M communications from the service network via the RF device, wherein the SCI only for the M2M communications indicates a maximum extended SCI only for the M2M communications;
   wherein the baseband device further selects an SCI, which is less than or equal to the maximum extended SCI only for the M2M communications, according to a type of service of the M2M communications, and instructs the RF device to monitor a paging channel according to the selected SCI.

2. The mobile communication device of claim 1, wherein the baseband device further transmits a General Extension Message to the service network via the RF device after the SCI is selected, and the General Extension Message indicates that the maximum extended SCI only for the M2M communications has been applied.

3. A service network, comprising:
   a radio access network performing wireless transmissions and receptions to and from a mobile communication device configured for Machine-to-Machine (M2M) communications; and
   a core network transmitting a System Parameters Message with a Slot Cycle Index (SCI) only for the M2M communications to the mobile communication device via the radio access network, wherein the SCI only for the M2M communications indicates a maximum extended SCI only for the M2M communications,
   such that the mobile communication device selects an SCI, which is less than or equal to the maximum extended SCI only for the M2M communications, according to a type of service of the M2M communications, and performs monitoring of a paging channel according to the selected SCI.

4. The service network of claim 3, wherein the core network further receives a General Extension Message from the mobile communication device via the radio access network after the transmission of the message, and the General Extension Message indicates that the mobile communication device has applied the maximum extended SCI only for the M2M communications.

5. An operation management method for M2M communications, comprising:
   providing a mobile communication device configured for the M2M communications with a service network;
   receiving, by the mobile communication device, a System Parameters Message with a Slot Cycle Index (SCI) only for the M2M communications from the service network, wherein the SCI only for the M2M communications indicates a maximum extended SCI only for the M2M communications;
   selecting, by the mobile communication device, an SCI, which is less than or equal to the maximum extended SCI only for the M2M communications, according to a service type of the M2M communications; and
   performing, by the mobile communication device, monitoring of a paging channel according to the SCI.

6. The operation management method of claim 5, further comprising transmitting, by the mobile communication device, a General Extension Message to the service network after the SCI is selected, wherein the General Extension Message indicates that the mobile communication device has applied the maximum extended SCI only for the M2M communications.

7. A mobile communication device, configured for Machine-to-Machine (M2M) communications, comprising:
   a Radio Frequency (RF) device performing wireless transmissions and receptions to and from a service network; and
   a baseband device transmitting a Registration Message, which indicates a preferred SCI only for the M2M communications, to the service network via the RF device, receiving a Registration Accepted Order corresponding to the Registration message with a Slot Cycle Index (SCI) only for the M2M communications from the service network via the RF device, and instructing the RF device to monitor a paging channel according to the received SCI only for the M2M communications,
   wherein the SCI only for the M2M communications indicates a granted SCI only for M2M communications to the mobile communication device.

8. The mobile communication device of claim 7, wherein the Registration Accepted Order further comprises a timer value for the mobile communication device to periodically receive overhead messages broadcasted by the service network, and the timer value is determined by the service network according to a type of service of the M2M communications.

9. A service network, comprising:
   a radio access network performing wireless transmissions and receptions to and from a mobile communication device configured for Machine-to-Machine (M2M) communications; and
   a core network receiving a Registration Message, which indicates a preferred SCI only for the M2M communications, from the mobile communication device via the radio access network, transmitting a Registration Accepted Order corresponding to the Registration message with a Slot Cycle Index (SCI) only for the M2M communications to the mobile communication device via the radio access network, such that the mobile communication device performs monitoring of a paging channel according to the received SCI only for the M2M communications, wherein the SCI only for the M2M communications indicates a granted SCI only for M2M communications to the mobile communication device.

10. The service network of claim 9, wherein the Registration Accepted Order further comprises a timer value for the mobile communication device to periodically receive overhead messages broadcasted by the service network, and the timer value is determined by the service network according to a type of service of the M2M communications.

11. An operation management method for M2M communications, comprising:

providing a mobile communication device configured for the M2M communications with a service network;

transmitting, by the mobile communication device, a Registration Message which indicates a preferred SCI only for the M2M communications to the service network;

receiving, by the mobile communication device, a Registration Accepted Order corresponding to the Registration message with a Slot Cycle Index (SCI) only for the M2M communications from the service network, wherein the SCI only for the M2M communications indicates a granted SCI only for M2M communications to the mobile communication device; and performing, by the mobile communication device, monitoring of a paging channel according to the granted SCI only for the M2M communications.

12. The operation management method of claim 11, wherein the Registration Accepted Order further comprises a timer value for the mobile communication device to periodically receive overhead messages broadcasted by the service network, and the timer value is determined by the service network according to a type of service of the M2M communications.

* * * * *